United States Patent
Liu

(10) Patent No.: US 10,143,336 B2
(45) Date of Patent: Dec. 4, 2018

(54) PORTABLE BARBECUE OVEN

(71) Applicant: A CARSFRIENDS NETWORK TECHNOLOGY CO., LTD, Ningbo (CN)

(72) Inventor: Guanxiong Liu, Ningbo (CN)

(73) Assignee: A Carsfriend Network Technology Co., Ltd., Ningbo (CN)

( * ) Notice: Subject to any disclaimer, the term of this patent is extended or adjusted under 35 U.S.C. 154(b) by 261 days.

(21) Appl. No.: 15/199,104

(22) Filed: Jun. 30, 2016

(65) Prior Publication Data

US 2017/0311756 A1 Nov. 2, 2017

(30) Foreign Application Priority Data

Apr. 27, 2016 (CN) .................... 2016 2 0373980 U

(51) Int. Cl.
    *A47J 37/07* (2006.01)
    *F16M 11/38* (2006.01)
    *A47J 37/06* (2006.01)

(52) U.S. Cl.
    CPC ....... *A47J 37/0763* (2013.01); *A47J 37/0623* (2013.01); *A47J 37/0704* (2013.01); *A47J 2037/0777* (2013.01); *F16M 11/38* (2013.01)

(58) Field of Classification Search
    CPC .......... A47J 2037/0777; A47J 37/0704; F16M 11/38
    USPC .......... 99/449; 126/9 R, 9 B, 25 R; 248/164, 248/188, 188.6; 108/117, 119, 120
    See application file for complete search history.

(56) References Cited

U.S. PATENT DOCUMENTS

| | | | | |
|---|---|---|---|---|
| 1,742,431 A | * | 1/1930 | Williams | D06F 81/04 108/117 |
| 4,993,706 A | * | 2/1991 | Wilkinson | A47B 9/16 108/117 |
| 5,318,322 A | * | 6/1994 | Home | A47J 37/0713 126/9 R |
| 6,205,912 B1 | * | 3/2001 | Chiu | A47J 37/0704 126/25 R |
| 6,439,221 B1 | * | 8/2002 | Ward | A47J 37/0704 126/25 R |
| 7,958,882 B1 | * | 6/2011 | Sgourides | F24C 3/14 126/25 R |
| 8,201,550 B2 | * | 6/2012 | Malumyan | A47J 37/0704 126/25 R |
| 9,096,247 B2 | * | 8/2015 | Witzel | B62B 1/008 |

\* cited by examiner

*Primary Examiner* — Reginald L Alexander
(74) *Attorney, Agent, or Firm* — Wang Law Firm, Inc.

(57) ABSTRACT

A portable barbecue oven includes an oven body, a scissor-shaped frame movably attached to the oven body having a first bracket and a second bracket, and two guiding wheels; the top end of the first bracket is adjustable relative to the oven body through a folding mechanism, and the folding mechanism includes a connection member and an adjustment piece; the adjustment piece has a slot for the connection member to pass through, the connection member can slide inside the slot so as to achieve the unfolding or folding of the scissor-shaped frame. Furthermore, during operation, the frame is lifted up and down stably by the rolling of the guiding wheel and the connection member is positioned by the position locking hole, so that the barbecue oven can be effectively prevented from toppling over during the unfolding or folding process.

3 Claims, 4 Drawing Sheets

PORTABLE BARBECUE OVEN

RELATE APPLICATIONS

This application claims benefit to Chinese Patent Applications 201620373980.4, filed on Apr. 27, 2016. The specifications of both applications are incorporated here by this reference.

FIELD OF THE INVENTION

The present invention relates to the field of barbecue ovens and in particular to a portable barbecue oven.

DESCRIPTION OF THE PRIOR ART

A barbecue oven generally includes an oven body, a net, a grill, feet and the like, wherein the feet are located below the oven body and used for supporting the over body. With regard to an existing barbecue oven, the oven body and the feet are fixed. This design is space consuming for storage and inconvenient to carry. For this reason, Chinese Patent CN 201143141Y (Patent No.: ZL200720125362.9), titled "Barbecue Oven Folding Device", disclosed a barbecue oven including an oven body; an articulating mechanism and a buckle slab are provided on two opposite sides of the bottom of the oven body, respectively, wherein the buckle slab forms a buckle slot which is open toward the articulating mechanism, and the articulating mechanism is articulated with a scissor-shaped horse including a first bracket and a second bracket which are crosswise articulated with each other. When the scissor-shaped horse is unfolded, the top end of the second bracket is embedded into the buckle slot, and when the scissor-shaped horse is folded, the top end of the second bracket is moved out of the buckle slot and overlapped with the first bracket.

The folding device in the above patent can realize the folding of the horse thus to reduce the space consumption and become convenient to carry. However, during the operation, the second bracket is to be moved out of or clamped into the buckle slot manually, this operation is inconvenient and labor consuming, and also, the barbecue oven is likely to wobble and even topple over during this operation.

SUMMARY OF THE INVENTION

A technical problem to be solved by the present invention is to provide, in view of the prior art, a portable barbecue oven which is easy to use.

To solve the technical problem, the portable barbecue oven comprises an oven body having a side wall; a scissor-shaped frame movably attached to the oven body, the scissor-shaped frame having a first bracket and a second bracket, each of the first bracket and the second bracket having a top end and a bottom end, the first bracket being pivoted to the second bracket, the top end of the first bracket and the top end of the second bracket being movably attached to the side wall of the oven body; and a plurality of guiding wheels attached to the bottom end of the first bracket, wherein the top end of the first bracket is adjustable relative to the oven body through a folding mechanism, and the folding mechanism comprises a connection member and an adjustment piece; the adjustment piece has a slot for the connection member to pass through, the connection member can slide inside the slot so as to achieve the unfolding or folding of the scissor-shaped frame; the connection member is connected to the top end of the first bracket or the side wall of the oven body, the adjustment piece is connected to the side wall of the oven body or the first bracket; a position locking hole for positioning the connection member is connected to the slot.

Preferably, the connection member is a bolt attached to the top end of the first bracket, the first bracket has a through hole at the top end thereof, the connection member passes through the slot and the through hole to movably connected the first bracket to the adjustment piece. Such arrangement is convenient, and the articulation of the first bracket with the oven body can be well realized.

Preferably, the first bracket includes a pair of a first side rod and a second side rod disposed opposite of each other and each having a top end and a bottom end; the second bracket include a pair of a third side rod and a fourth side rod disposed opposite of each other and each having a top end and a bottom end; and a shaft lever is connected between bottom ends of the first side rod and the second side rod; the first side rod of the first bracket is movably connected to the third side rod of the second bracket to form a X shape, and the second side rod of the first bracket is movably connected to the fourth side rod of the second bracket to also form another X shape; the top ends of the first side rod and the second side rod are respectively pivoted to the oven body through the folding mechanism; two guiding wheels disposed respectively at two ends of the shaft lever of the first bracket; and a hand grab is connected between bottom ends of the third side rod and the fourth side rod of the second bracket. In this way, when in the folded state, the hand grab is held and lifted upward, and the barbecue oven can be moved by the guiding wheel. When the guiding wheel is rolled inward along the ground, the connection member slides to the inner side of the barbecue oven along the slot, and the scissor-shaped frame is unfolded and supports the oven body. Now, the barbecue oven can be used normally. When the barbecue oven is to be folded, the guiding wheel is rolled outward along the ground, so that the connection member slides to the outer side of the barbecue oven along the slot and the first bracket and the second bracket are overlapped. Now, the scissor-shaped frame is folded.

To make the internal structure of the scissor-shaped frame more firm, preferably, a reinforcement plate is respectively connected between the first side rod and the second side rod of each of the first bracket and between the third side rod and the fourth side rod of the second bracket, at the position close to a pivoting point of the first bracket and the second bracket.

To avoid relative displacement between the scissor-shaped frame and the oven body and between the first bracket and the second bracket when in the folded state, preferably, the side walls of the scissor-shaped frame and the side walls of the oven body are detachably connected by a pair of a hook and a snap.

Compared with the prior art, in the present invention, a plurality of guiding wheels are attached to the bottom end of the first bracket, the top end of the first bracket is adjustable relative to the oven body through a folding mechanism, and the folding mechanism comprises a connection member and a slot for the connection member to pass through and slide so as to achieve the unfolding or folding of the scissor-shaped frame. Compared with the prior art, the present invention is convenient, and the barbecue oven can be folded quickly, so that the space consumption is reduced and it is convenient to carry. Furthermore, during the operation, the scissor-shaped frame is lifted up and down stably by the rolling of the guiding wheel and the connection member is positioned by the position locking hole, so that the barbecue

DETAILED DESCRIPTION OF THE PREFERRED EMBODIMENT

Figure 1:
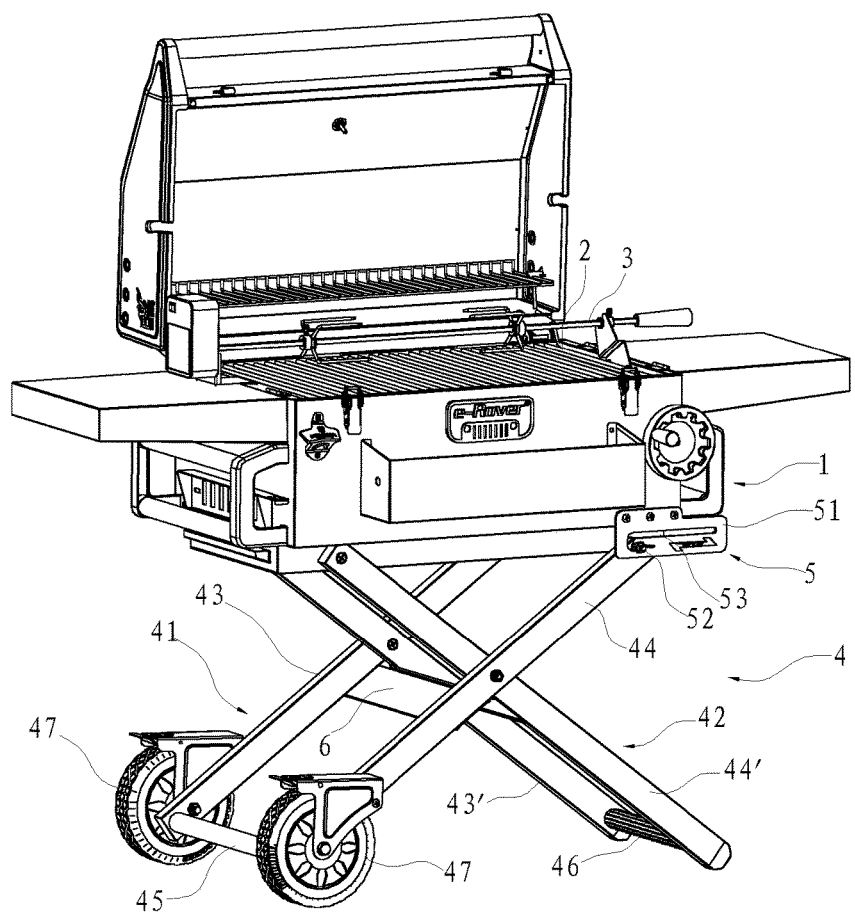
FIG. 1 is a perspective view of a portable barbecue oven according to an embodiment of the present invention (when the portable barbecue oven is in use)
Figure 2:
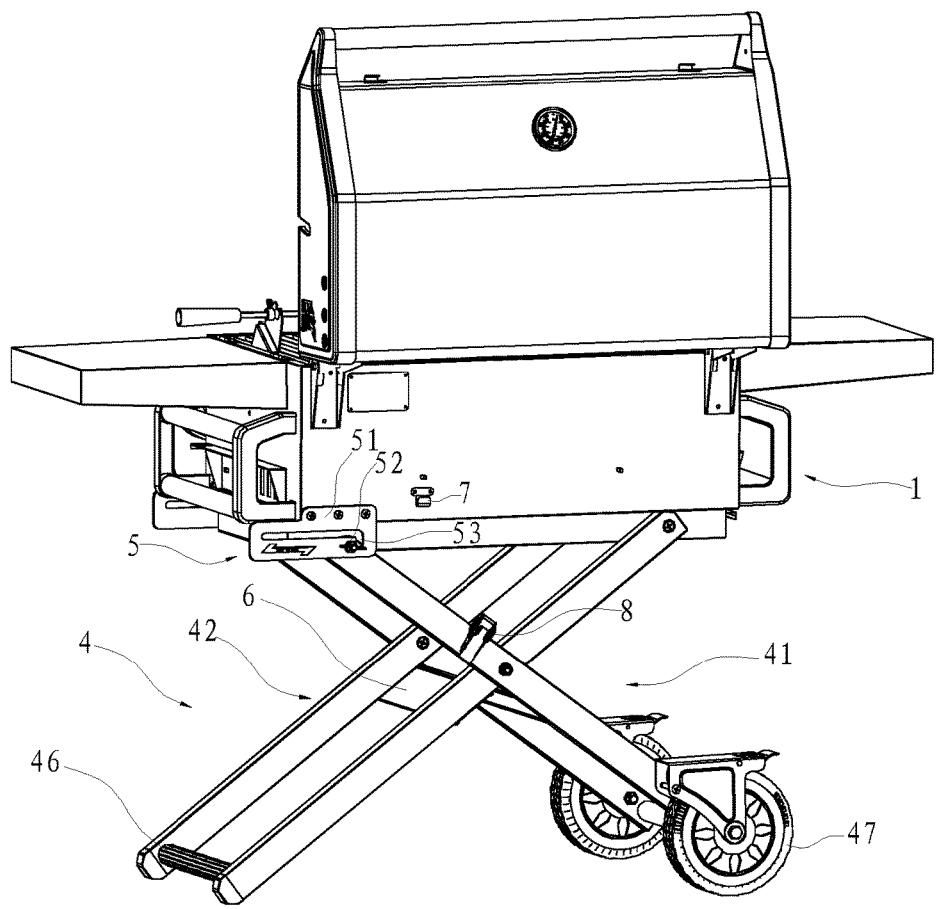
FIG. 2 is a rear view of the portable barbecue oven according to the embodiment of the present invention.
Figure 3:
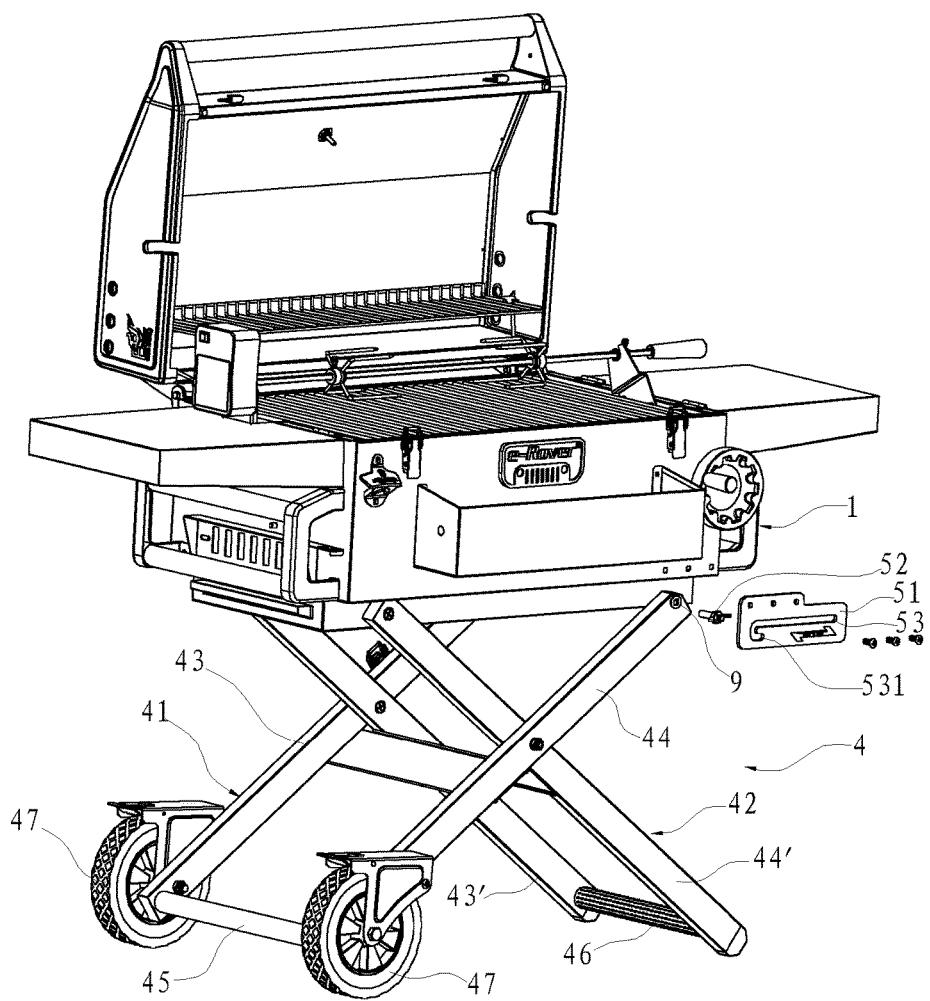
FIG. 3 is an exploded view of the partial structure of the portable barbecue oven according to the embodiment of the present invention.
Figure 4:
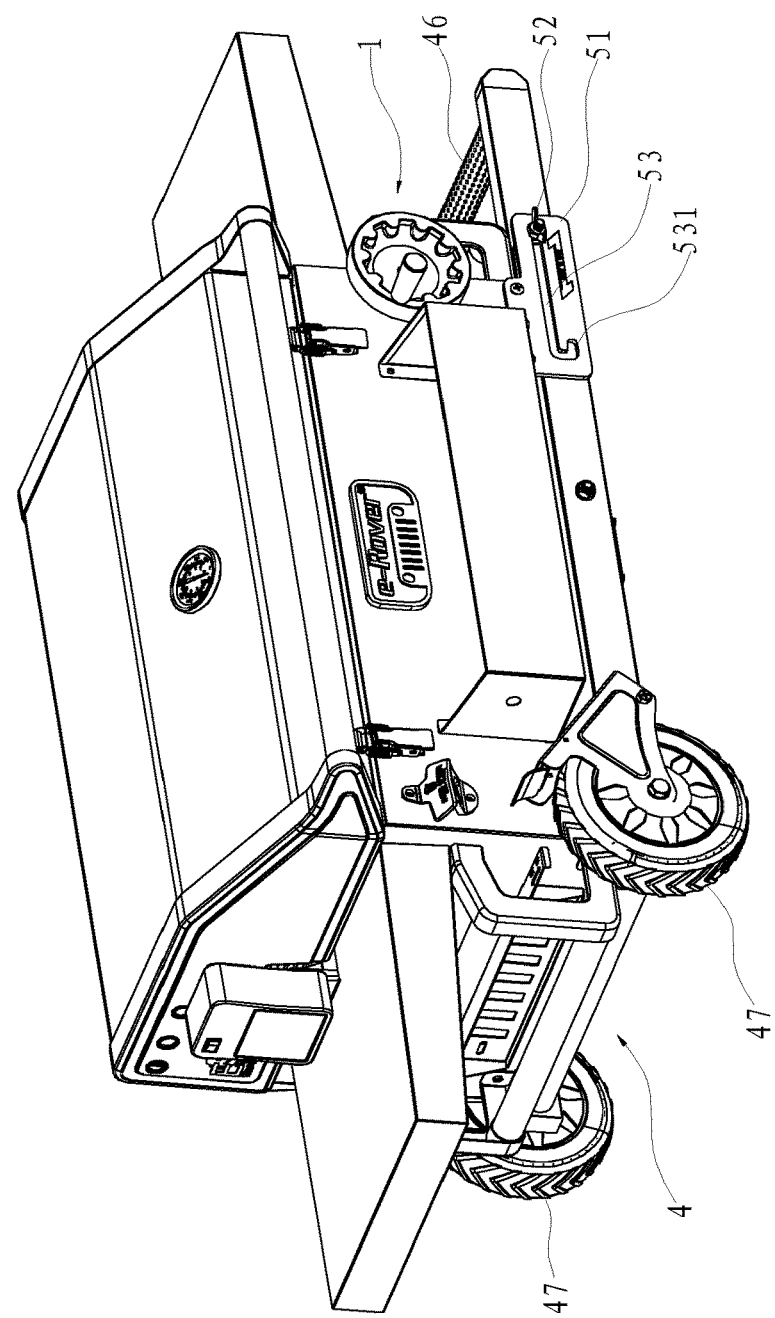
FIG. 4 is a perspective view of the portable barbecue oven according to an embodiment of the present invention in another state (when the portable barbecue oven is in folded state).

To enable a further understanding of the present invention content of the invention herein, refer to the detailed description of the invention and the accompanying drawings below:

As shown in FIG. 1 to FIG. 4, the portable barbecue oven comprises an oven body 1, a net 2 horizontally provided in the oven body 1, a grill 3 spanned above the net 2, a scissor-shaped frame 4 movably attached to the oven body 1 and two folding mechanisms 5.

The scissor-shaped frame 4 has a first bracket 41 and a second bracket 42, each of the first bracket 41 and the second bracket 42 has a top end and a bottom end, the first bracket 41 is pivoted to the second bracket 42, the top end of the first bracket 41 and the top end of the second bracket 42 are respectively movably attached to the side wall of the oven body 1. In this embodiment, the detail is, the first bracket 41 includes a pair of a first side rod 43 and a second side rod 44 disposed opposite of each other and each having a top end and a bottom end; the second bracket 42 includes a pair of a third side rod 43' and a fourth side rod 44' disposed opposite of each other and each having a top end and a bottom end; and a shaft lever 45 is connected between bottom ends of the first side rod 43 and the second side rod 44; the first side rod 43 of the first bracket 41 is movably connected to the third side rod 43' of the second bracket 42 to form a X shape, and the second side rod 44 of the first bracket 41 is movably connected to the fourth side rod 44' of the second bracket 42 to also form another X shape ; the top ends of the first side rod 43 and the second side rod 44 are respectively pivoted to the oven body 1 through the folding mechanism 5; two guiding wheels 47 are disposed respectively at two ends of the shaft lever 45 of the first bracket 41; and a hand grab 46 is connected between bottom ends of the third side rod 43' and the fourth side rod 44' of the second bracket 42. In this way, when the barbecue oven is in the folded state, the hand grab 46 can be held and lifted upward, then the barbecue oven can be moved through the guiding wheels 47.

Further, each folding mechanism 5 comprises a connection member 52 and an adjustment piece 51, the adjustment piece 51 has a slot 53 for the connection member 52 to pass through. In this embodiment, the adjustment piece 51 is square, with part of the top end thereof being extended upward to form a mounting portion. The mounting portion has a plurality of mounting holes through which bolts are penetrated to fixedly connect the adjustment piece 51 to the side walls of the oven body 1. Correspondingly, the connection member 52 is a bolt attached to the top end of the first bracket 41, the first side rod 43 and the second side rod 44 of the first bracket 41 has a through hole 9 at the top end thereof, the connection member 52 passes through the slot 53 and the through hole 9 to movably connected the first bracket 41 to the adjustment piece 51.

To make the connection between the adjustment piece 51 and the first bracket 41 more firm, a position locking hole 531 for positioning the connection member 52 is connected to the slot 53. To make the internal structure of the scissor-shaped frame 4 more firm, a reinforcement plate 6 is respectively connected between the first side rod 43 and the second side rod 44 of each of the first bracket 41 and between the third side rod 43' and the fourth side rod 44' of the second bracket 42, at the position close to a pivoting point of the first bracket 41 and the second bracket 42. To avoid relative displacement between the scissor-shaped frame 4 and the oven body 1 and between the first bracket 41 and the second bracket 42 when in the folded state, in this embodiment, the side walls of the frame 4 and the side walls of the oven body 1 are detachably connected by a detachable snap structure. In detail, a hook 7 is provided on a rear side wall of the oven body 1, and a snap 8 hooked onto the hook 7 is provided on a rear outer side of the frame 4.

The barbecue oven in this embodiment is unfolded in such a way: hold the hand grab 46 on the second bracket 42 and press downward it; lift the second bracket 42 up and transfer the force to the first bracket 41; the guiding wheels 47 on the first bracket 41 is rolled inward so that the connection member 52 on the first bracket 42 slides toward the inner side of the barbecue oven along the slot 53; when the scissor-shaped frame 4 is completely unfolded, clamp the connection member 52 into the position locking hole 531, and now screw the connection member 52 (i.e., the bolt) to tightly connect the adjustment piece 51 to the scissor-shaped frame 4, so that the scissor-shaped frame 4 supports the oven body 1 firmly.

The barbecue oven in this embodiment is folded in such a way: release the connection member 52 and move out from the position locking hole 531, the guiding wheel 47 on the first bracket 41 is rolled outward, the connection member 52 slides to the outer side of the barbecue oven along the slot 53, and the included angle between the first bracket 41 and the second bracket 42 is gradually reduced until they are overlapped with each other. Now, the scissor-shaped frame 4 is completely folded. Finally, on the back of the barbecue oven, connect the snap 8 on the rear outer side wall of the scissor-shaped frame 4 to the hook 7 on the rear outer side wall of the oven body 1. In this way, the barbecue oven is folded.

The invention claimed is:

1. A portable barbecue oven comprising:
    an oven body having a side wall;
    a scissor-shaped frame movably attached to the oven body, the scissor-shaped frame having a first bracket and a second bracket, each of the first bracket and the second bracket having a top end and a bottom end, the first bracket having a first side rod and a second side rod disposed opposite each other, the second bracket having a third side rod and a fourth side rod disposed opposite each other, each side rod having a top end and a bottom end, the first bracket being pivoted to the second bracket, the top end of the first bracket and the top end of the second bracket being movably attached to the side wall of the oven body; and
    a plurality of guiding wheels attached to the bottom end of the first bracket, wherein the top end of the first bracket is adjustable relative to the oven body through a folding mechanism, and the folding mechanism comprises a connection member and an adjustment piece;

a shaft lever is connected between the bottom ends of the first side rod and the second side rod, and two guiding wheels are disposed respectively at two ends of the shaft lever;

a hand grab is connected between bottom ends of the third side rod and the fourth side rod of the second bracket;

the adjustment piece has a slot for the connection member to pass through, the connection member can slide inside the slot so as to achieve the unfolding or folding of the scissor-shaped frame;

the connection member is connected to the top end of the first bracket or the side wall of the oven body, the adjustment piece is connected to the side wall of the oven body or the first bracket;

the side wall of the scissor-shaped frame and the side wall of the oven body are detachably connected by a hook and a snap the first side rod of the first bracket is movably connected to the third side rod of the second bracket to form an X shape, and the second side rod of the first bracket is movably connected to the fourth side rod of the second bracket to also form another X shape; the top ends of the first side rod and the second side rod are respectively pivoted to the oven body through the folding mechanism;

a position locking hole for positioning the connection member is connected to the slot.

2. The barbecue oven of claim 1, wherein the connection member is a bolt attached to the top end of the first bracket, the first bracket has a through hole at the top end thereof, the connection member passes through the slot and the through hole to movably connected the first bracket to the adjustment piece.

3. The barbecue oven of claim 1, wherein a reinforcement plate is respectively connected between the first side rod and the second side rod of each of the first bracket and between the third side rod and the fourth side rod of the second bracket, at the position close to a pivoting point of the first bracket and the second bracket.

* * * * *